July 3, 1962

A. K. ANANDER 3,041,931

HALFTONE CAMERA

Filed March 31, 1958

INVENTOR:
ANDREW K. ANANDER

BY
ATTORNEYS

July 3, 1962

A. K. ANANDER 3,041,931

HALFTONE CAMERA

Filed March 31, 1958

INVENTOR:
ANDREW K. ANANDER

BY

ATTORNEYS

July 3, 1962

A. K. ANANDER 3,041,931

HALFTONE CAMERA

Filed March 31, 1958

INVENTOR:
ANDREW K. ANANDER

BY

ATTORNEYS

July 3, 1962
A. K. ANANDER
3,041,931
HALFTONE CAMERA
Filed March 31, 1958
7 Sheets-Sheet 4
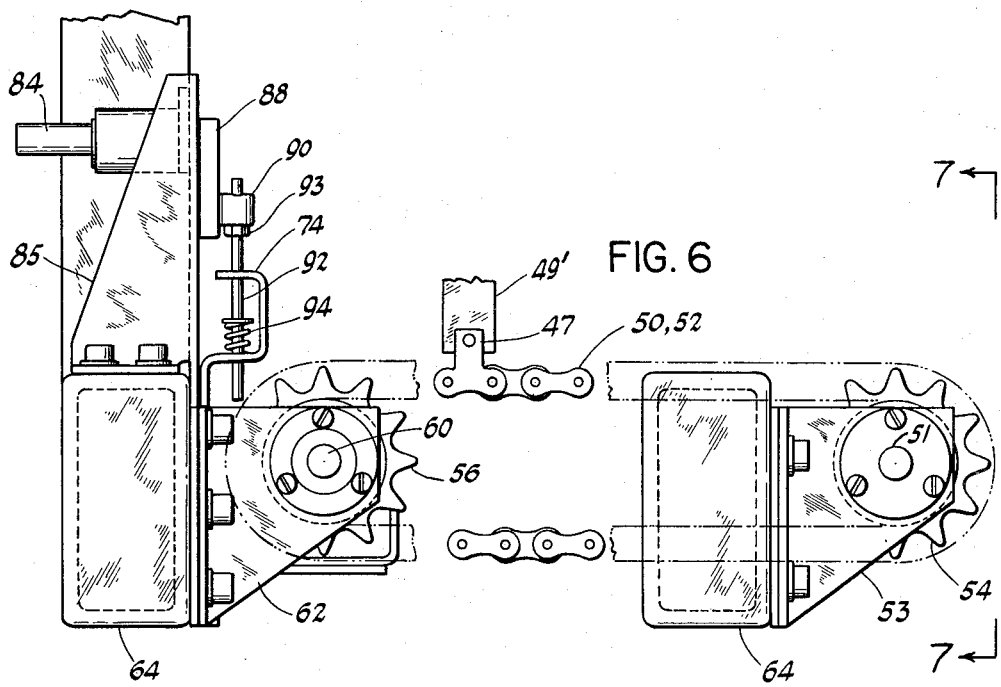
FIG. 6
FIG. 11
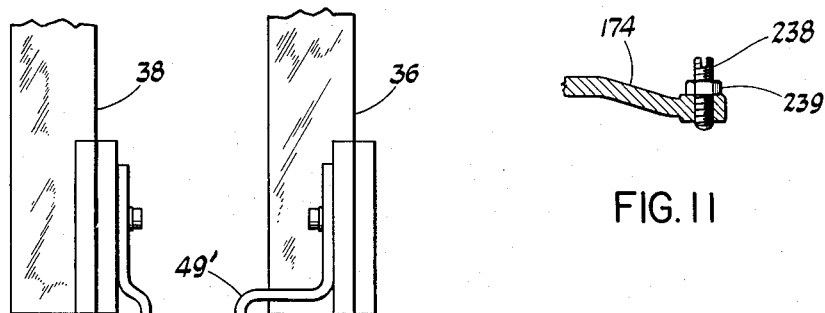
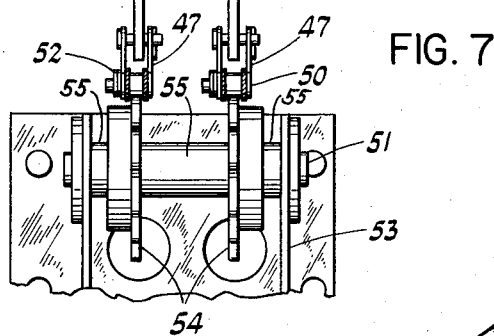
FIG. 7
INVENTOR:
ANDREW K. ANANDER
BY
ATTORNEYS July 3, 1962 A. K. ANANDER 3,041,931
HALFTONE CAMERA
Filed March 31, 1958 7 Sheets-Sheet 5

INVENTOR:
ANDREW K. ANANDER
BY
ATTORNEY

July 3, 1962

A. K. ANANDER 3,041,931

HALFTONE CAMERA

Filed March 31, 1958

INVENTOR:
ANDREW K. ANANDER

BY

ATTORNEYS.

July 3, 1962 A. K. ANANDER 3,041,931
HALFTONE CAMERA
Filed March 31, 1958 7 Sheets-Sheet 7
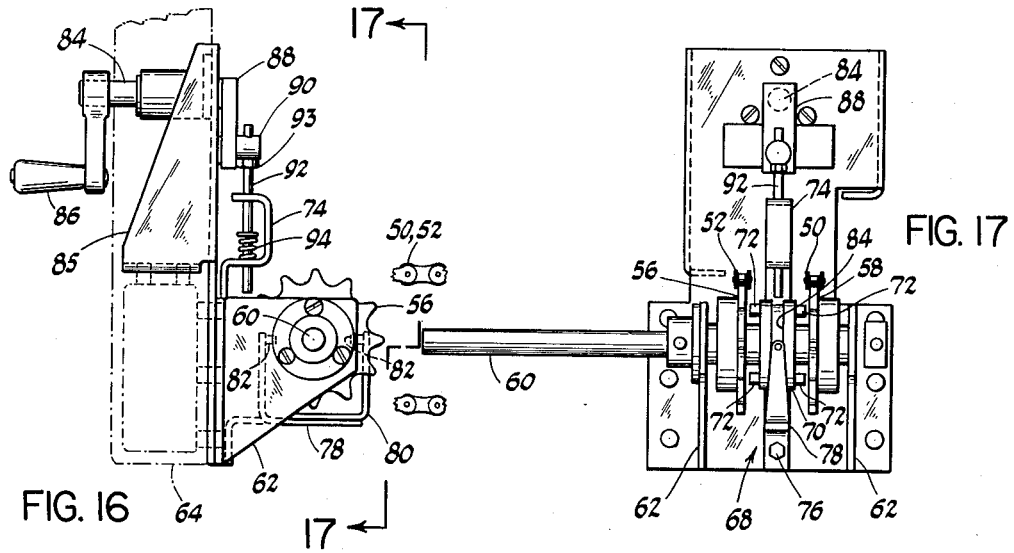
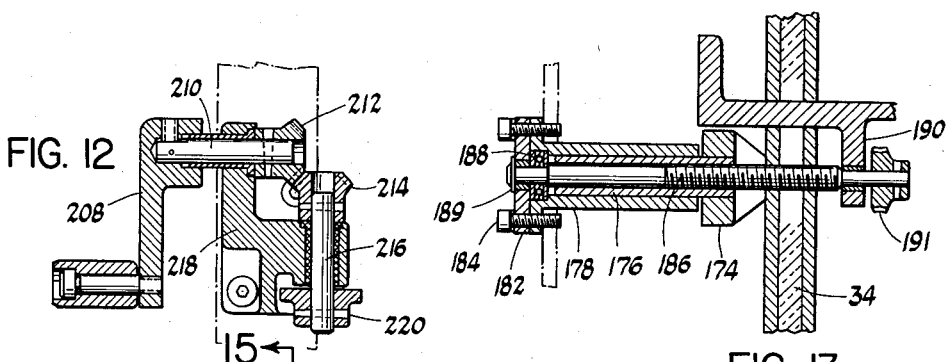
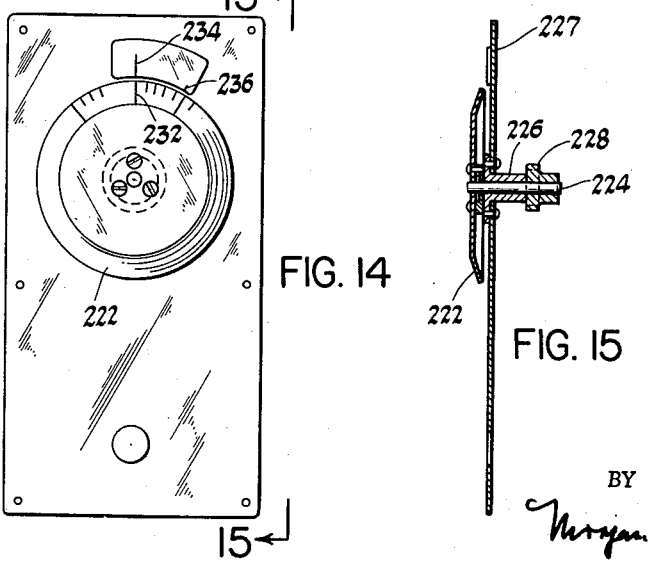
INVENTOR:
ANDREW K. ANANDER
BY
ATTORNEYS.

United States Patent Office 3,041,931
Patented July 3, 1962

3,041,931
HALFTONE CAMERA
Andrew K. Anander, Glen Cove, N.Y., assignor to Powers Chemco, Inc., Glen Cove, N.Y., a corporation of New York
Filed Mar. 31, 1958, Ser. No. 725,249
6 Claims. (Cl. 88—24)

This invention relates to photomechanical cameras and has particular relation to an improved camera of this type and which employs halftone screens with the camera being especially adapted for use with a plurality of screens having different characteristics.

Objects and advantages of the invention will be obvious herefrom, or may be learned by practice with the invention, the same being realized and attained by means of the instrumentalities and combinations pointed out in the appended claims.

The present invention has for its object the provision of an improved photomechanical camera adapted for use with halftone screens of varying characteristics or for use without a halftone screen. A further object is the provision of such a camera having a plurality of halftone screens mounted therein and selectively movable to and from the exposure area and a storage area laterally adjacent the exposure area. A still further object is the provision of such a photomechanical camera employing mechanical means for selecting the particular halftone screen that is to be moved into or from the exposure area and for moving the screen to its desired location. Another object of the invention is to provide such a camera wherein this mechanical means includes mechanism for moving the halftone screen along the optical axis of the camera and in parallel relation with the camera's focal plane into the proper exposure position and to resiliently retain the screen in this position. Still another object is to provide such a camera wherein the positioning of the screen for exposure may be conveniently adjusted with an indication of the screen position being provided. A still further object of the invention is to provide such an improved photomechanical camera which is extremely convenient to use and yet is highly accurate and reliable in operation, producing the highest caliber of work.

The photomechanical camera of the present invention includes a lens, bellows and a support organization that holds the photosensitive material in place for exposure. This support organization is constructed so that anyone of a plurality of supports may be selectively moved into operative position, as for example a suction type film support or a support for sensitized glass plate. Immediately in front of the support for the photosensitive material in the exposure area of the camera is a facility for receiving and manipulating halftone screens, with this facility being organized to selectively position one of a plurality of halftone screens in proper relation with the sensitized material for exposure. The present invention is concerned primarily with this facility and in accordance with the invention there is provided means for moving any one of a plurality of halftone screens of different characteristics in a lateral direction to or from the exposure area of the camera from or to a storage area located laterally of the exposure area. Mechanical transfer mechanism is operative to laterally move the halftone screens and a selector is effective to select the screen to be moved by this transfer mechanism. The screens are mounted in support frames and each of the support frames includes a lever mechanism for moving the screen toward the film on the film support, or whatever sensitive material is used, in parallel relation with the focal plane of the camera. Upon moving a screen and its frame from the storage area into the exposure area the lever mechanism mounted on the frame engages an actuator which forms part of the camera and may be manipulated exteriorly of the camera. Through this actuator the screen is moved toward the sensitized material and engages adjustable stops that position it in its proper operative relation with the sensitized material, with the actuator being effective to resiliently urge the screen into engagement with these stops. These stops are simultaneously adjustable exteriorly of the camera in order to vary the operating position of the screen and the stops include individually adjustable means by which the position of the screen is accurately brought into parallel relation with the focal plane of the camera and with the sensitized material.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

In the drawings:

FIGURE 4 is a side elevation of the screen and screen support frame of FIGURE 3 and is taken generally from line 4—4 of FIGURE 3;

FIGURE 6 is a detailed view of the chain drive for one of the screen supports and which moves the support laterally to and from the storage area and the exposure area;

FIGURE 7 is an end view of the organization of FIGURE 6 and is taken from line 7—7 of FIGURE 6;

FIGURE 11 is a sectional view of a portion of one of the stops and is taken generally along line 11—11 of FIGURE 10;

FIGURE 12 is a detailed sectional view of the crank operator for the stop adjusting mechanism;

FIGURE 13 is a detailed sectional view of the connection of the stop adjusting mechanism with an individual stop, with this view being taken generally along line 13—13 of FIGURE 10;

FIGURE 14 is a detailed view of the stop position indicator;

FIGURE 15 is a side view of this indicator taken from line 15—15 of FIGURE 14;

FIGURE 16 is a detailed view of the drive mechanism for moving the screens laterally to and from the exposure area and the storage area and of the selector mechanism for selecting which of the screens is to be moved, and;

FIGURE 17 is an elevational view of this drive and selector mechanism and is taken generally from line 17—17 of FIGURE 15.

Figure 1:
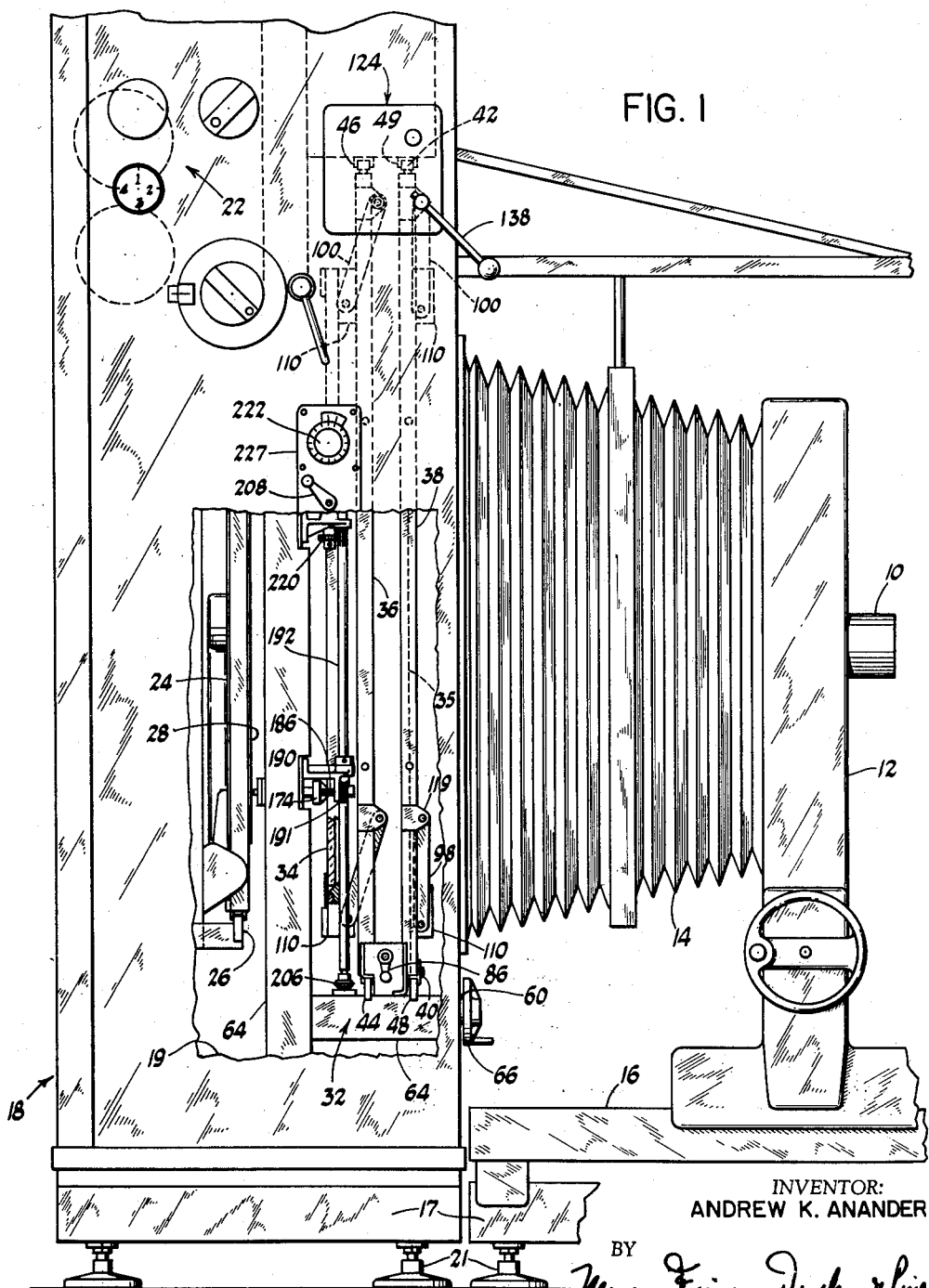
FIGURE 1 is a fragmentary side elevation of the photomechanical camera of this invention with the portion of the camera housing at the side of the camera being broken away to shown in detail the portions of the camera with which this invention is concerned.

Referring now to the drawings, wherein like reference characters designate like elements throughout, the preferred and illustrative embodiment of the invention depicted therein includes a conventional lens 10 mounted in a suitable shutter on a lens board 12 at the forward end of bellows 14, the lens board being supported for horizontal movement along the rail 16 toward and from the halftone screen and the sensitized material, with the halftone screen lying slightly in front of the sensitized material and both being parallel to the focal plane of the lens 10. The bellows 14 are attached to the back 18 of the camera which is a light tight sheet metal box or housing 19 containing the halftone screens and the sensitized material supports, and which is preferably provided at its rear with light-tight doors such as 20 that open into the dark room and provide access to the rear of the camera. The camera, including rails 16 and back 18, is mounted on suitable base members 17 which are in turn supported on foot members 21. Many auxiliary parts of the camera are omitted from the showing of the present illustration as they are unnecessary to a full understanding thereof and as many different forms of such parts may be used as desired.

Positioned above the exposure area of the camera and preferably forming a part of the camera back 18 is a film support and supply organization designated generally 22 and which is adapted to support one or more rolls of film from which selected lengths of the desired grade of photographic film may be fed and cut, thereby supplying a sheet of film to the face of the support that is positioned in the exposure area, the film being conveniently fed downwardly from a supply roll by means of manually actuatable feed rolls. One such suitable film feeding means is shown in my prior Patent No. 2,741,963 of 1956.

Figure 2:
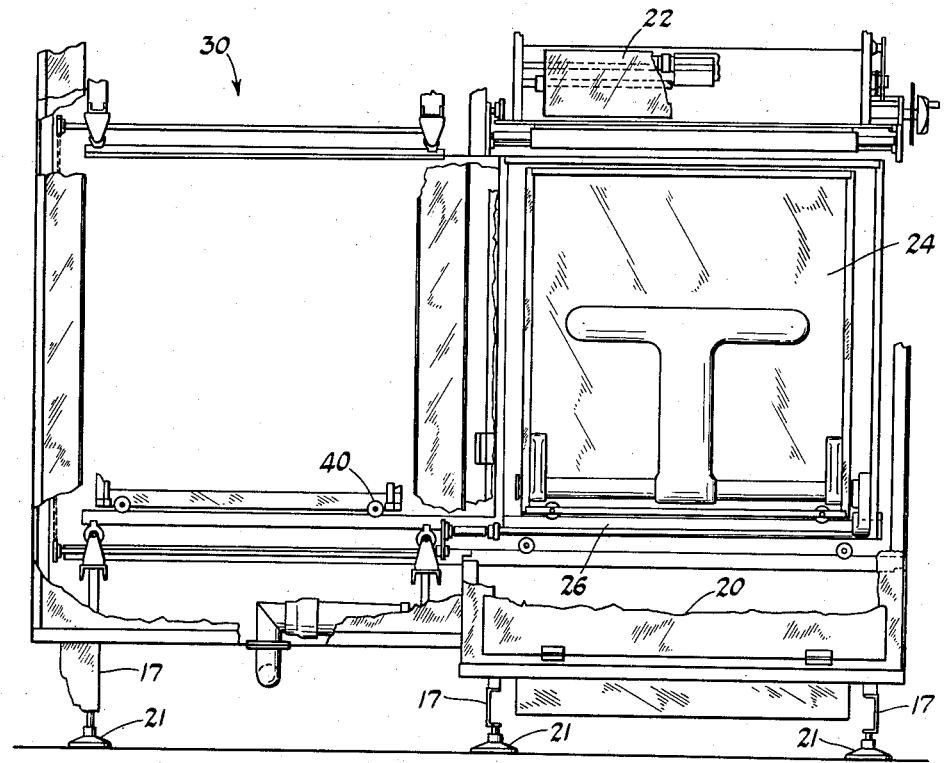
FIGURE 2 is a rear elevational view of the camera with the back of the housing broken away.

In the illustrative organization of FIGURES 1 and 2 there is shown in the exposure area the vacuum film support 24 which is mounted upon rail 26 and which has perforations or openings distributed throughout the area of its face for retaining film sheet 28 against the face of the support by suction. To the left of film support 24, as viewed in FIGURE 2, is a storage area 30 wherein there may be stored a ground glass focusing plate mounted in a suitable support. The construction of the camera is such that the film support 24 may be moved laterally from the exposure area into storage area 30 and the ground glass focusing plate may be moved into the exposure area. The details of the mechanism for effecting such an interchange and for manipulating the various supports does not form a part of the present invention and accordingly is not shown in the drawing with this mechanism and facility being the subject of copending application Serial No. 702,144 filed Dec. 11, 1957, in the names of Norman C. Schutt, Floyd W. Flynn and John L. Bjelland, now U.S. Patent No. 2,939,371.

In front of and spaced slightly from film support 24 is the halftone screen facility 32 with which the present invention is particularly concerned. This facility, as illustratively disclosed, is organized so that either of two halftone screens 34 or 35 may be positioned in the exposure area with the screen that is not in the exposure area being positioned in storage area 30 or alternatively both of the screens may be positioned in storage area 30 and the camera operated without the use of a halftone screen. While in the preferred and illustrative embodiment of the invention two halftone screens may be selectively employed as desired, it is to be understood that this is merely illustrative and is not to be taken as restrictive of the invention since the invention obviously encompasses the use of more than two halftone screens if one desires to construct the camera for such use.

Figure 3:
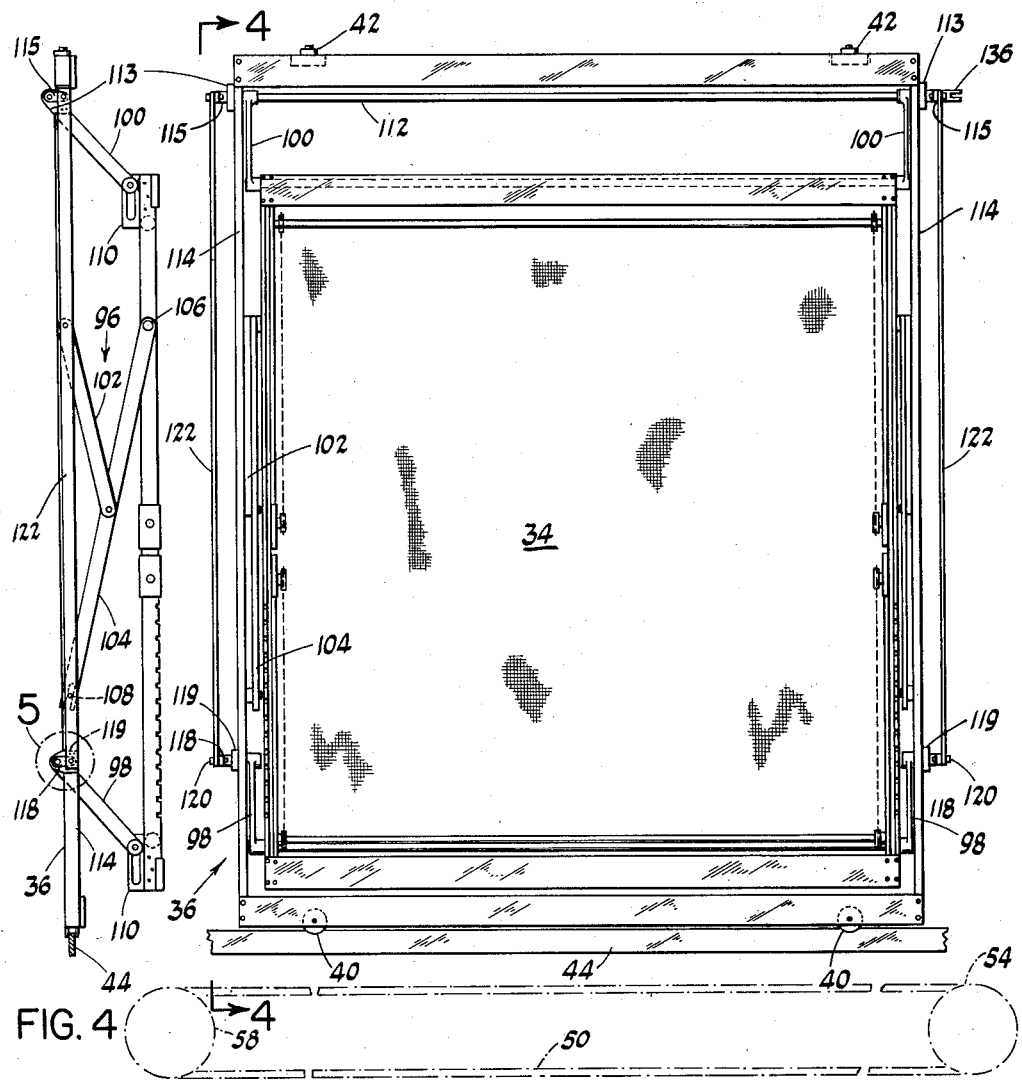
FIGURE 3 is a rear view of one of the screens and its support frame, per se, mounted in the exposure area of the camera.

As embodied, halftone screen 34 is mounted in a suitable frame 36 with this frame and screen, as designated in FIGURE 1, being located in the exposure area. The other halftone screen 35, which is of a different characteristic than screen 34 and which, as indicated, is mounted in frame 38 is positioned in the storage area. Each of the frames is provided at its lower end with a pair of horizontally spaced flanged rollers or wheels 40 and at its upper end with a pair of similarly spaced guide rollers 42 (FIGURE 3). The wheels 40 and guide rolls 42 of halftone screen frame 36 are received upon the upper end of rail 44 and between the downwardly extending flanges of guide rail 46, respectively, while the wheels and guide rolls of frame 38 are received upon rail 48 and guide channel 49, respectively. Each of these rails and guide channels extend laterally from the exposure area into and across storage area 30 so that halftone screen frames 38 and 36 may be rolled along the respective rail to and from the exposure area and the storage area whereby either of the screens may be positioned in the exposure area or if desired both screens may be disposed in the storage area.

This lateral movement of the screen frames and accordingly the screens is effected by a mechanical transfer apparatus which is positioned generally beneath these frames and includes means to select which of the screens is to be moved, with this transfer apparatus being controlled and actuated exteriorly of the camera. This transfer apparatus is shown in detail in FIGURES 6, 7, 16 and 17 and a portion of the apparatus is shown in FIGURES 3 and 1. As embodied, this apparatus includes a pair of endless drive members 50 and 52, in the form of chains, with chain 50 being secured to frame 36 through link 47 and arm 49' and chain 52 being secured to frame 38 through a similar link and arm. Each of these chains is trained over one of the gears 54 with there being two such gears, one located generally beneath each of the rails 44 and 48 and just within the storage area of the camera and adjacent the exposure area. These gears are mounted on shaft 51 that is carried by brackets 53. Spacers 55 are positioned between the gears 54 and between these gears and the brackets 53. Chain 50 is additionally trained over drive gear 58 with this chain extending between these two gears 58 and 54 while chain 52 is trained over drive gear 56 and extends between this drive gear and gear 54. Each of these drive gears is journaled to drive shaft 60 which is in turn journaled to brackets 62 that extend from and are secured to camera frame 64, the drive shaft 60 extending through housing 19 to the exterior of the camera and having an actuator 66 secured to its outer end. The disposition of drive gears 56 and 58 on shaft 60 is such that these gears are rotatable relative to this shaft but are prevented from moving axially along the shaft. Intermediate drive gears 56 and 58 is a positively acting clutch organization 68 operative to engage either of the drive gears to positively connect the engaged gear with the drive shaft 60 so that it rotates therewith while the other gear remains stationary and the drive shaft rotates therewithin. This clutch 68 includes disk 70 which is keyed or otherwise secured to drive shaft 60 so that it rotates with the shaft but is freely movable along or axially of the shaft. Projecting outwardly from each face of this disk are pegs 72 and the axial dimension of the disk with the pegs attached is such that it may be positioned between the drive gears 56 and 58 without engaging either of these gears. Each of these gears is provided with opening or recesses complementary to the pegs 72 so that the disk may be moved axially of drive shaft 60 with the pegs being received in these complementary recesses of either drive gear and thereby positively connecting either drive gear to the drive shaft.

This axial movement of disk 70 is effected by an actuating mechanism that has a dead center position and on either side of dead center urges the disk into engagement with an opposite one of the drive gears. This actuating mechanism includes bracket 74 which is pivoted at its lower end about stud 76 and has secured to its lower end an outwardly extending arm 78 upon which is secured yoke 80. At the extremity of the arms of yoke 80 are a pair of inwardly extending fingers 82 that are received within circumferential recess 84 formed in the periphery of disk 70. Thus, by pivotal movement of bracket 74, disk 70 is moved longitudinally along shaft 60 into engagement with either of the drive gears. This pivotal movement of bracket 74 is effected through shaft 84 which is journaled to support 85 secured to a portion of camera frame 64. The shaft has secured to its inner end lever 88 and to its outer end operating handle 86 for disposition of this handle exteriorly of housing 19. Journaled to the end of lever 88 is member 90 with this member being bored to slidably receive the upper end of rod 92 upon which is threaded the nut 93 that is in abutting engagement with this member 90. Rod 92 extends downward from member 90 and is received within suitable openings provided in the horizontally extending portions of the reverse bend formed at the upper end of bracket 74. Compressed between bracket 74 and a suitable anchor on rod 92 is spring 94 with this spring being effective to urge nut 93 into engagement with member 90. As shown in FIGURES 16 and 17 bracket 74 is in its dead center position with this actuating organization being such that when so positioned spring 94 is compressed to its greatest extent with the spring expending as shaft 84 is rotated in either direction from this dead center position and with disk 70 being moved into engagement with drive gear 56 when bracket 74 is pivoted counterclockwise as viewed in FIGURE 17 and into engagement with drive gear 58 when this bracket is moved clockwise. Thus spring 94 is effective to bias or retain the clutch in engagement with the particular drive gear that is selected to be operated.

After moving either of the halftone screens, whichever is desired, from the storage area into the exposure area the screen is then moved axially of the camera and in parallel relation with the focal plane of the camera toward the sensitized material or as shon in FIGURE 1 toward film sheet 28. In order to accomplish this result each of the frames 36 and 38 includes a parallel motion mechanism. This mechanism, best shown in FIGURES 3 and 4, includes the lever system 96 for supporting the weight of the screen, the lower pair of pivotal arms 98 and the upper pair of pivotal arms 100 for moving the screen axially of the camera. Lever system 96, one of which is located on each side of the screen frame (FIGURE 3), includes link 102 hich is pivoted at its upper end to the screen frame and is pivotally connected at its lower end with link 104 intermediate the extremities of this link. Link 104 is in turn pivotally connected at its upper end 106 to the screen or rather the rigid boundry disposed about the screen and is provided at its low end with a bifurcate between the arms of which is received pin 108 that extends from the screen frame. With this lever system 96 axial movement of the screen from the frame is substantially rectilinear.

Figure 5:
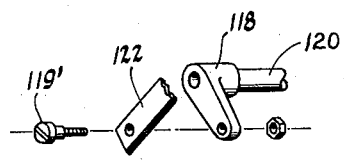
FIGURE 5 is an exploded prospective view of a detail of the motion transmitting mechanism that is carried by the screen support, with this detail being within the circle identified as 5 in FIGURE 4.

The pair of arms 98 and 100 that are responsible for moving the screen axially of its frame are pivoted about their upper ends and are provided with pins at their lower ends with these pins being received in vertically elongated slots provided in brackets 110 that are secured to the rigid boundary of the screen. The pair of horizontally spaced arms 100 are secured to horizontally extending rod 112 that is journaled to the screen frame, extending through suitable brackets 113 secured to the upright members 114 of the frame. Secured to each end of rod 112 and outwardly of members 114 are the crank arms 115. Similar crank arms 118 are secured to stub shafts 120, one of which extends through and is journaled to each of the brackets 119 which are similar to brackets 113 and are secured to the upright members 114 (FIGURE 3) well below brackets 113. Rotational movement of crank arms 115 is imparted to crank arms 118 and accordingly stub shafts 120 through connecting links 122 which extend between and are pivotally connected to the outer ends of the vertically spaced crank arms 115 and 118 as shown, with one of these connections being shown in exploded view in FIGURE 5 and with the connection being effected by the threaded member 119'. One of the arms 98 is secured to each of the stub shafts 120 so that this lower pair of arms moves simultaneously with and through the same arc as the upper pair of arms 100.

In order that the screen may be moved axially of the camera into its proper operating position with respect to the film without the necessity of gaining access to the interior of the camera or in other words from outside the camera and in order that the screen will be resiliently biased to its operating position there is secured to the camera, actuating mechanism designated generally 124 (FIGURES 1, 8 and 9) which is effective to accomplish these results. This mechanism is automatically connected with the parallel motion means of the screen frame upon moving the screen frame laterally along its support rail from the storage area into the exposure area. This actuating mechanism includes the horizontally spaced shafts 126 and 128 which are rotatably mounted in brackets 130 and 132, these brackets being secured to the camera frame. The inner end of each of the shafts 126 and 128 is provided with a laterally extending stud 134 to form a key for engagement in the slot of member 136 secured to the end of shaft 112 of each of the screen frames 36 and 38. The horizontal spacing and the respective location of shafts 126 and 128 is such that the inner end of shaft 126 is received within the slot in member 136 of screen frame 36 while the inner end of shaft 128 is received within the slot in member 136 of screen frame 38.

Figure 8:
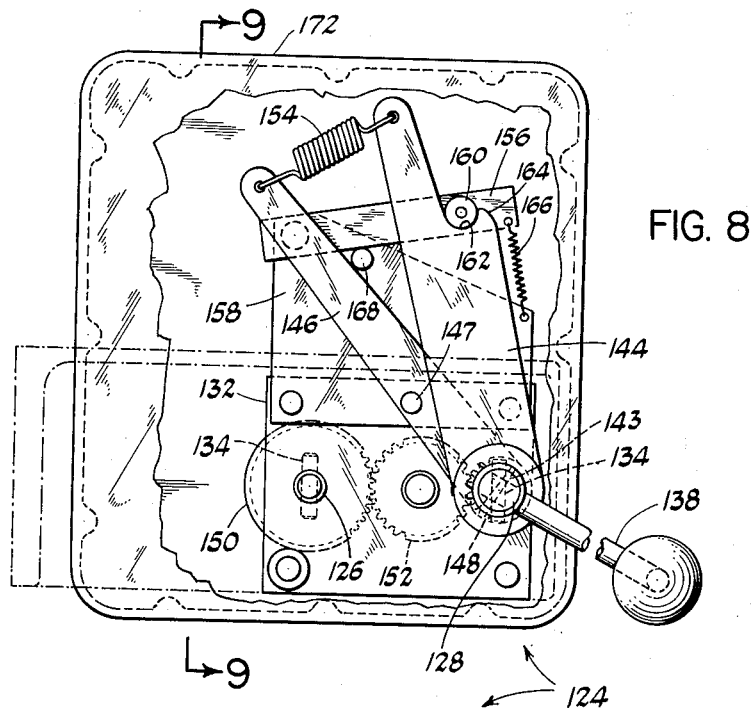
FIGURE 8 is a detailed view of the actuator or actuating mechanism that is mounted on the camera frame and through which the screen is moved toward and away from the film, with the housing for this mechanism being broken away to show the details of the mechanism.
Figure 9:
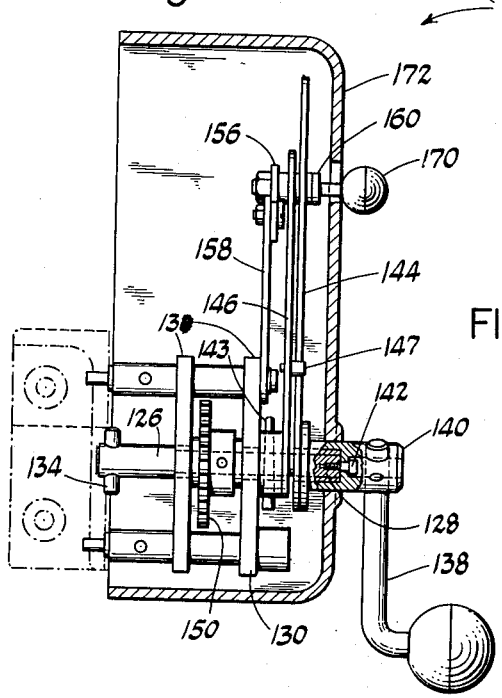
FIGURE 9 is a side elevational view of the mechanism of FIGURE 8 taken from line 9—9 of that figure, with a portion of this mechanism being broken away to show details thereof.

Rotation of shafts 126 and 128 in a clockwise direction, as viewed in FIGURE 8, moves the screen toward film 28 and into its operative position and this movement is effected through a spring connection 154 while movement of the screen in a forward direction and away from film sheet 28 is effected by a positive connection between the actuating member and the shafts 126 and 128. Rotation of shafts 126 and 128 is effected by handle 138 which is connected to cylindrical member 140, this member being journaled to the outer end of shaft 128 by being provided with a counterbore at both its inner and outer ends, with shaft 128 being rotatably received within the counterbore at the inner end and with cap screw 142 received within the other counterbore and retaining this member on the shaft. Secured to the inner end of cylindrical member 140 is the elongated arm 144 and an immediate adjacent relation to this arm 144 is arm 146 which is secured to shaft 128 as by tapered pin 143 for movement with the shaft. Secured to and projecting laterally from arm 146 is stop pin 147 which is located to the left of arm 144 (FIGURE 8) and is engaged by this arm when it is rotated in a counterclockwise direction as viewed in this FIGURE 8. Rotation of shaft 128 simultaneously effects rotation of shaft 126 through the illustrated gear train which includes gear 148 secured to shaft 128, gear 150 secured to shaft 126 and the intermediate gear 152 mounted on an idler shaft and meshed with each of these gears. Interconnecting the outer ends of arms 144 and 146 is tension spring 154 through which clockwise rotation of shafts 126 and 128 is had as viewed in FIGURE 8 while counterclockwise rotation is through pin 147.

When handle 138 is rotated clockwise as viewed in FIGURE 8 to move one of the screens towards the sensitized material and into its operative position arm 144 is also moved clockwise. This movement of arm 144 urges arm 146, through spring 154, for clockwise rotation which is effective to resiliently urge the screen to and retain it in its operative position in the exposure area whether it is the screen of frame 36 or the screen of frame 38. When in its operative position the screen is parallel with the focal plane of the lens and with the sheet of sensitized material and this position is determined by stops that are provided to limit the rearward movement of the screen and against which the screen engages to properly position it with the screen being resiliently urged into engagement with these stops through the medium of spring 154.

The screen is retained in its operative position, i.e. in engagement with these stops, by means of latch 156 which is pivoted to plate 158 that extends up from the bracket 130. The latch 156 is provided with pin 160 that is adapted to be received in a complementary recess 162 provided in the upper portion of arm 144. In response to rotation of arm 144 to its extreme position in the clockwise direction latch 156 is cammed over nose 164 formed on arm 144 and pin 160 falls within recess 162. The latch 156 is biased to its latching position by tension spring 166 and stop pin 168 limits the clockwise rotation of this latch. Release of latch 156 is had by means of manual operator 170 in the form of an operating knob which extends from pin 160 to the exterior of housing 172 that encloses the actuating mechanism.

Through this actuating mechanism it will be seen that when one of the screen frames 36 or 38 is moved into the exposure area from the storage area the screen may be moved into its operative position immediately in front of the sensitized material and resiliently urged into engagement with the stops which define this position. When it is desired to remove the screen this mechanism is effective to positively move the screen from its operative position into a position within the screen frame whereupon the frame may be moved laterally into the storage area.

Figure 10:
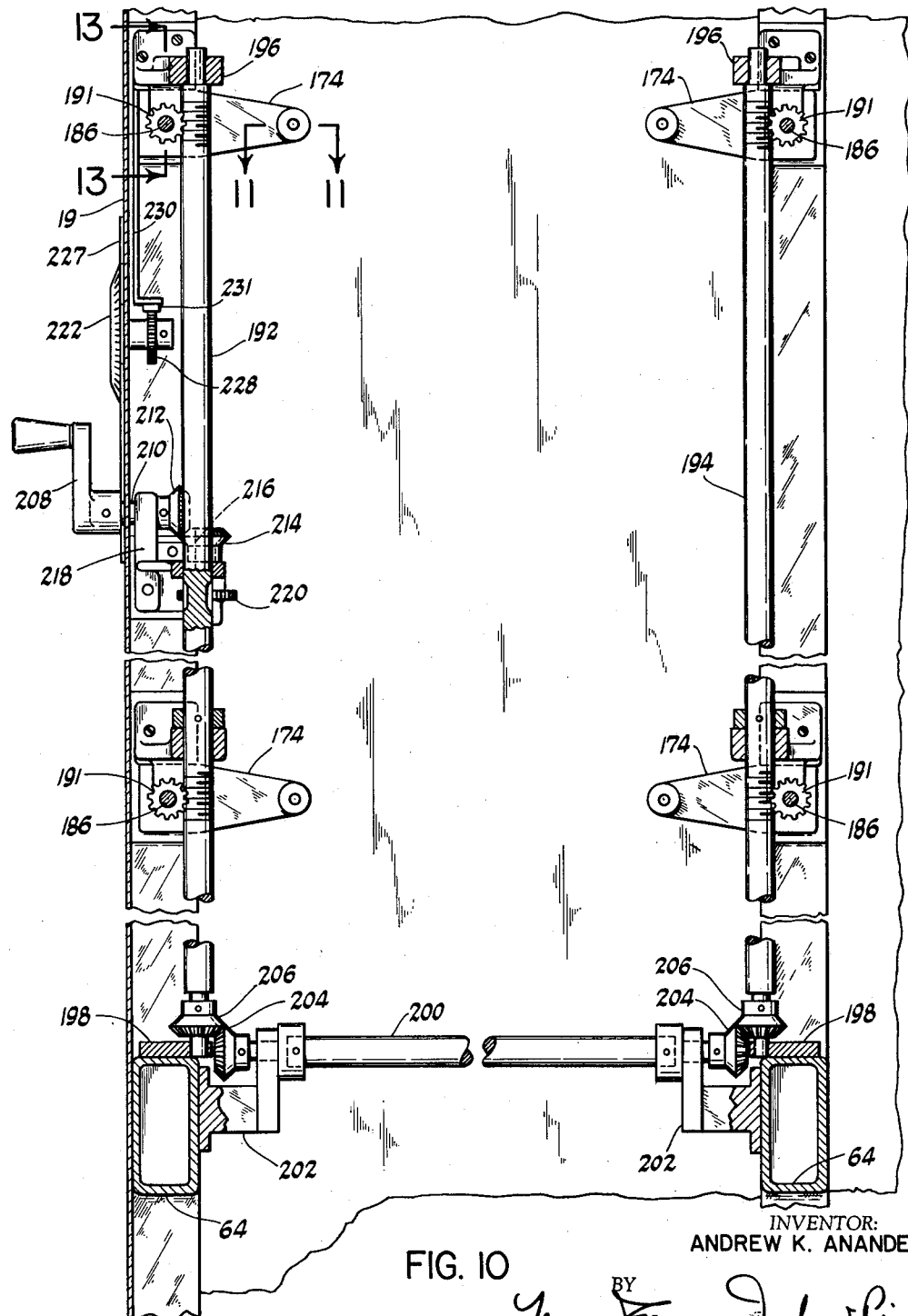
FIGURE 10 is an elevational view of the screen stops and the mechanism for simultaneous adjustment of the several stops with this mechanism being mounted on the camera frame.

The stops for limiting rearward movement of the screen and for assuring that the screen is properly positioned in parallel relation wth the sensitized material and the focal plane of the camera take the form of laterally extending arms 174 which are mounted so that they may be adjusted axially of the camera. In the illustrative organization, as shown in FIGURE 10, there are four stop arms 174 and FIGURE 13 shows one of these arms and its actuating mechanism in detail. As shown, the outer end of the arm is provided with a laterally extending portion in the form of sleeve 176 which is received in cylinder 178 that is in turn secured to the stationary plate 182 by bolts 184 and with plate 182 being part of the camera frame. Sleeve 176 and cylinder 178 are of non-circular cross section so that the sleeve may move axially within the cylinder but may not rotate relative to the cylinder. Axial adjustment of sleeve 176 and accordingly of arm 174 is effected by means of screw threaded actuating rod 186 which extends through and is threadedly received in sleeve 176 with one end of this rod being received in the bearing 188 provided in cylinder 178 and with the other end being journaled to bracket 190 which is secured to the camera frame. Actuating rod 186 is restrained from moving axially by its engagement with bearing 188, which acts as a thrust as well as a radial bearing, and by a resilient ring or horseshoe fastener 189 received in a suitable recess in the end of the rod. Thus as the rod is rotated it is effective through its threaded engagement with sleeve 176 to move the sleeve axially along the rod and within the cylinder 178.

Simultaneous adjustment of the four stop arms 174 is effected through a suitable mechanical actuating arrangement (FIGURE 10) that includes a worm wheel 191 secured to each of the rods 186 with these worm wheels for the vertically spaced pair of arms 174 on the left side of the camera as viewed in FIGURE 10 engaging worms formed on rod 192 while the corresponding worm wheels for the pair of arms 174 on the right side of the camera engage worms formed on rod 194. The rods extend between and are journaled to brackets 196 and 198 and simultaneous rotation of these rods is effected through connecting rod 200 which is journaled to brackets 202 and has secured to its opposite ends beveled gears 204 that mesh with similar gears 206 secured to the rods 192 and 194. Rotation of rods 192 and 194 is effected exteriorly of the camera housing by means of handle 208 which is secured to the outer end of the shaft 210 that extends through housing 19 and is journaled to bracket 218. Secured to its other or inner end of this shaft is beveled gear 212 and meshed with gear 212 is beveled gear 214 which is secured to shaft 216 that is also journaled to bracket 218 and has secured to its lower end gear 220. This gear 220 is meshed with a gear formed on shaft 192. Thus, by rotation of handle 208 rods 192 and 194 are simultaneously rotated equal angular increments and thus through the worm and worm wheel drives for each of the stop arms 174 these arms are moved equal amounts and in the same direction axially of the camera so that the stops are simultaneously moved toward or away from the sensitized material to vary the position of the halftone screen with relation to this material.

In order that the position of the stops and accordingly the screen will be known a position indicator is provided which is visible exteriorly of the camera. This indicator includes the rotatable disk 222 secured to shaft 224 which is journaled to boss 226 extending inwardly from plate 227 that is secured to the camera housing 19. Secured to the inner end of shaft 224 is the gear 228 and extending downwardly from the upper left arm 174 in FIGURE 10 is finger 230 which carries rack 231 that meshes with this gear and which is effective to rotate the gear and accordingly disk 222 in response to axial movement of this arm 174. Indices 232 are provided adjacent the periphery of disk 222 and an index 234 is provided for registering with these indices. Indices 232 are spaced so that to indicate one thousandth of an inch increments of adjustment of the stops 174. In addition to index 234 another index 236 is provided and is spaced from index 234 at an angular distance which represents five of the indices 232 or in other words five thousandths of an inch with relation to the movement of the stop arms. The purpose of this additional index 236 is for initial adjustment purposes wherein a five thousandth thickness feeler gage is inserted between the stop arms 174 and the halftone screen. This gage is inserted between the screen and each stop arm, one at a time, and with the screen parallel with the focal plane of the camera the screw threaded adjusting stud 238 on each of the arms 174 (FIGURE 11) is adjusted as required so that when the screen engages all of the stops it will be parallel with the focal plane of the camera. Adjusting stud 238, which is the portion of stop 174 that engages the screen, is locked in its adjusted position by lock nut 239.

The indicating device is helpful in this initial adjustment of the stops since when properly adjusted the same indices 232 should be opposite index 236 when the five thousandth feeler gage is successively positioned between each of the stops and the screen.

In accordance with the present invention there is thus provided mechanism for positioning a preselected one of a plurality of halftone screens in the exposure area of the camera and moving the screen axially of the camera toward the sensitized material and resiliently retaining the screen in its proper position with relation to this material and parallel with the focal plane of the camera. The screens are moved to and from the exposure area of the camera and a storage area laterally of the camera through manipulating mechanism that is accessible exteriorly of the camera.

With the mechanism of this invention the camera may be operated selectively with one of a plurality of halftone screens of different characteristics or may be operated without the use of a halftone screen with the manipulation of the screens being extremely simple and with an accurate positioning of the screens being had.

The invention in its broader aspects is not limited to the specific mechanism shown and described but departures may be made therefrom, within the scope of the ac-

What is claimed is:

1. In a halftone screen camera having a housing defining an exposure area, a storage chamber on one side and operatively associated with said housing, a plurality of halftone screens, a frame for each of said screens, means for supporting each of said frames for transverse movement from said storage chamber into said housing, means for moving a selected frame from said storage chamber into said housing to travel its associated screen from a storage position to a position parallel to and in front of the focal plane of said camera, means on each of said frames supporting its associated screen in vertical disposition, said supporting means including spaced support elements, means mounting said support elements for parallel movement and back and forth relative to said frame to move its associated screen in and out of a preselected exposure position in said housing, means for actuating said support mounting means, said actuating means including a resilient element for yieldably urging said screen into said exposure position and drive elements for moving said screen out of exposure position, and movable stop elements on said housing for limiting the travel of said halftone screen at said selected exposure position.

2. The invention as defined in claim 1 wherein said frame supporting means extends from said storage chamber into said housing.

3. The invention as defined in claim 1 wherein said means for actuating said support mounting means is operative to engage said support mounting means upon arrival of said frame at the limit of its transverse travel into said housing.

4. A halftone screen camera having a housing defining an exposure area, a storage member at one side of and operatively associated with said housing, a plurality of halftone screens, a frame for each of said screens, an endless conveyor secured to each of said frames, means mounting said endless conveyors for travel through said storage chamber and said housing, means mounting said frames on one of said endless conveyors for transverse movement to and from said storage chamber to and from said housing, means for selectively driving one of said endless conveyors to move its associated frame from storage position to a position parallel to and in front of the focal plane of said camera, means on each of said frames supporting its associated screen in vertical disposition, said supporting means including spaced support elements, link members operatively connected to said frame and said support elements adapting said support elements for parallel movement relative to said frame to move its associated screen into and out of exposure position in said housing, means for selectively actuating said support mounting means and movable stop elements on said housing for limiting the travel of said halftone screen at a selected exposure position.

5. The invention as defined in claim 4 wherein said means for actuating said support mounting means is operatively connected to said support mounting means upon arrival of its associated frame at the limit of its transverse travel into said housing, said actuating means including a resilient element for yieldably urging said screen into said exposure position and mechanism comprising gear members for positively moving said screen out of exposure position.

6. The invention as defined in claim 4 including separate means for each of said stop elements for movably mounting said elements on said housing and common actuating means operatively associated with each of said stop mounting means for simultaneously varying the position of said stop members to locate said screen in a selected exposure position.

References Cited in the file of this patent

UNITED STATES PATENTS

| | | |
|---|---|---|
| 1,033,404 | Huebner | July 23, 1912 |
| 1,452,077 | Huebner | Apr. 17, 1923 |
| 1,535,225 | Hays et al. | Apr. 28, 1925 |
| 2,402,107 | Wekeman | June 11, 1946 |
| 2,564,934 | Sussin | Aug. 21, 1951 |
| 2,643,187 | Linzell | June 23, 1953 |